(12) United States Patent
Olston et al.

(10) Patent No.: US 8,819,064 B2
(45) Date of Patent: Aug. 26, 2014

(54) METHOD AND SYSTEM FOR DATA PROVENANCE MANAGEMENT IN MULTI-LAYER SYSTEMS

(75) Inventors: Chris Olston, Mountain View, CA (US); Anish Das Sarma, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 255 days.

(21) Appl. No.: 13/022,334

(22) Filed: Feb. 7, 2011

(65) Prior Publication Data
US 2012/0203782 A1 Aug. 9, 2012

(51) Int. Cl.
*G06F 17/30* (2006.01)
(52) U.S. Cl.
USPC .......................... 707/776; 707/779
(58) Field of Classification Search
CPC ................................ G06F 17/30557
USPC .......................... 707/769, 776, 779
See application file for complete search history.

(56) References Cited

U.S. PATENT DOCUMENTS

| | | | | |
|---|---|---|---|---|
| 2008/0072290 | A1* | 3/2008 | Metzer et al. | 726/3 |
| 2008/0307104 | A1* | 12/2008 | Amini et al. | 709/231 |
| 2010/0070463 | A1* | 3/2010 | Zhao et al. | 707/608 |
| 2010/0094902 | A1* | 4/2010 | Vyvyan | 707/781 |
| 2010/0287204 | A1* | 11/2010 | Amini et al. | 707/802 |
| 2012/0054146 | A1* | 3/2012 | Gupta et al. | 707/602 |
| 2012/0185871 | A1* | 7/2012 | Allen et al. | 719/313 |

OTHER PUBLICATIONS

Bowers, S. et al.; "Provenance in Collection-Oriented Scientific Workflows"; Concurrency and Computation: Practice and Experience, 20(5): 2008; pp. 519-529.
Cheney, J. et al.; "Provenance in Databases: Why, How and Where", Foundations and Trends in Databases, 1(4): 2009, pp. 379-474.
Boulakia-Cohen, S. et al.; "Addressing the Provenance Challenge Using ZOOM", Concurrency and Computation: Practice and Experience, 20(5): 2008; pp. 497-506.
Davidson, S. B. et al.; "Provenance in Scientific Workflow Systems", IEEEE Data Engineering Bulletin, 30(); 2007; pp. 44-50.
Eltabakh, M. Y. et al.; "Supporting Annotations on Relations", In Proc. EDBT, 2009; pp. 1-12.
Haevy, A. Y. et a.; "Answering Queries Using Views: a Survey", VLDB Journal, 10(4); 2001; pp. 270-294.
Srivastava, D.; et al.; "Intensional Associations Between Data and Metadata", Proc. ACM ISGMOD, 2007.
Szomszor, M. et al.; "Recording and Reasoning over Data Provenance in Web and Grid Services", Proc. Int'l. Conference on Ontologies, Databases and Applications of Semantics, 2003, pp. 1-18.

* cited by examiner

*Primary Examiner* — Jorge A Casanova
(74) *Attorney, Agent, or Firm* — Pillsbury Winthrop Shaw Pittman LLP

(57) ABSTRACT

Method, system, and programs for heterogeneous data management. Information from multiple data sources is first obtained. Data/metadata from each of the data sources is modeled based on the source and/or granularity information of the data/metadata to generate data/metadata models. The data/metadata from multiple data sources are integrated, by applying one or more processes to the data/metadata from different data sources based on the data/metadata models, to generate integrated data/metadata. A provenance representation for the integrated data/metadata is created tracing sources, granularities, and/or processes applied and archived for enabling an query associated with the integrated data/metadata.

20 Claims, 15 Drawing Sheets

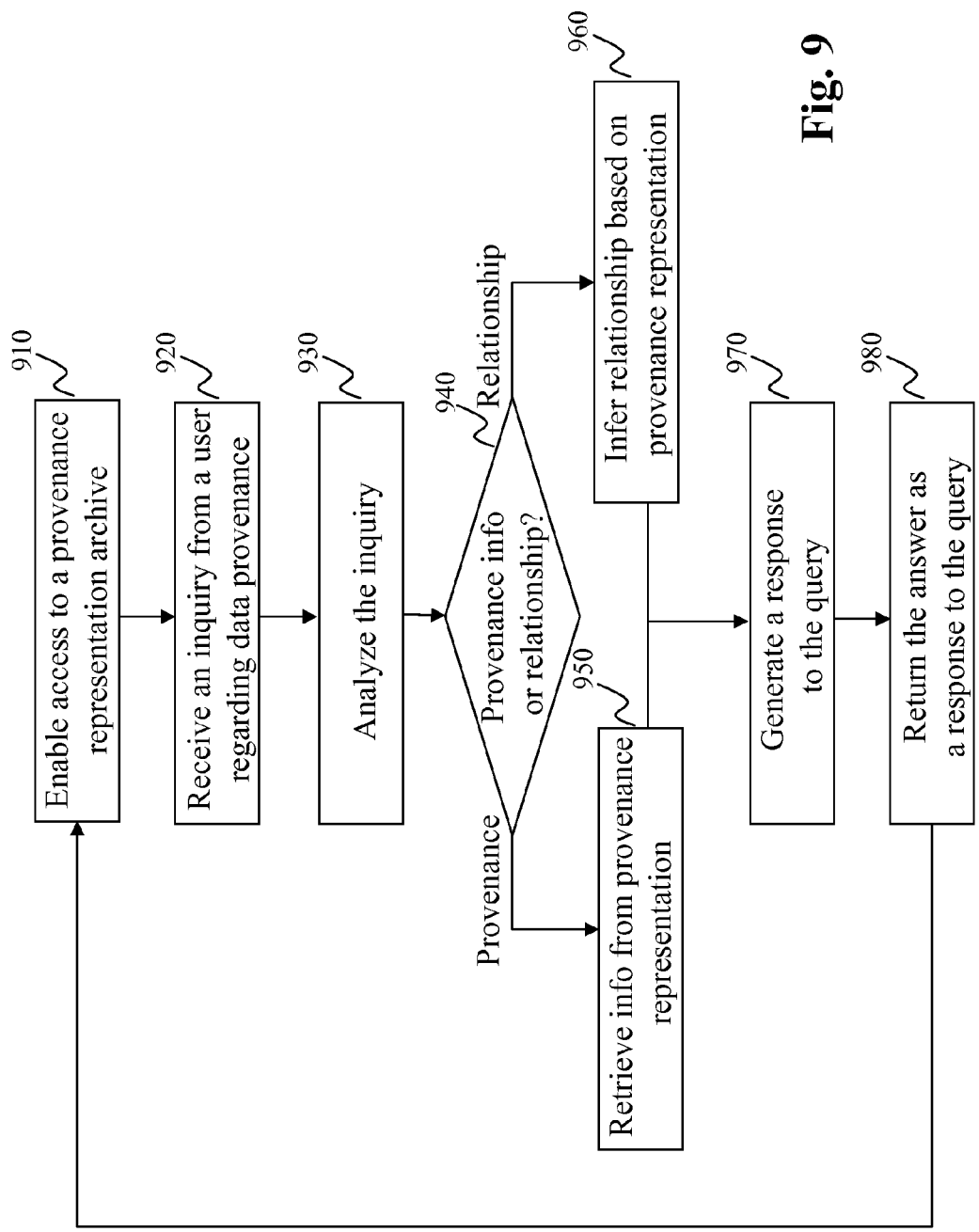

METHOD AND SYSTEM FOR DATA PROVENANCE MANAGEMENT IN MULTI-LAYER SYSTEMS

BACKGROUND

1. Technical Field

The present teaching relates to methods, systems and programming for data management. Particularly, the present teaching is directed to methods, systems, and programming for heterogeneous data management.

2. Discussion of Technical Background

Modern systems are often comprised of multiple semi-independent sub-systems. For example, there are three types of systems that are commonly used. The first type is the so-called stacked systems with higher-level abstractions stacked upon lower-level systems. The second type of system is pipelined systems, in which data flows through a sequence of systems, e.g. a system for ingesting Really Simple Syndication (RSS) feeds, a system for processing the feeds, then a system for indexing and serving the feeds via, e.g., a search interface. A third type of system is called side-by-side systems. For example, fault tolerant systems are usually side-by-side systems, i.e., two or more systems providing the same function may operate side-by-side at the same time. Side-by-side systems are often deployed during a migration period, in which responsibility is often transferred from one system to another in a gradual manner to allow the new system to be vetted and fine-tuned. In another scenario, redundant systems are usually deployed in a permanent side-by-side configuration, with each one targeting a different point in some performance tradeoff space such as latency versus throughput.

Modularity in these forms facilitates the creation of complex systems, but can complicate operational issues, including monitoring and debugging of end-to-end data processing flows. To follow a single RSS feed from beginning to end may require interacting with half a dozen sub-systems, each of which likely has different metadata and different ways of querying it. Solutions that rely on standardization efforts or deep code modifications are often cost prohibitive and usually unrealistic especially when third-party components are used.

Arguably the most complex type of metadata to manage is data provenance. A system that aims to integrate provenance metadata from multiple sub-systems frequently has to deal with the inherent nonuniformity and incompleteness. To begin with, different sub-systems often represent data and processing elements at different granularities. For example, data granularities may range from tables (coarse-grained) to individual cells of tables (fine-grained), with multiple possible mid-granularity options such as rows versus columns versus temporal versions. Process descriptions also run the gamut from coarse-grained (e.g. an SQL query or Pig script) to fine-grained (e.g. one Pig operator in one retry attempt of one map task), with multiple ways to sub-divide mid-granularity elements, e.g., map and reduce phases versus Pig operations (which may span phases) versus parallel partitions.

Moreover, links among processing and data elements sometimes also span granularities. For example, one system may record a link from each (row, column group, version) combination to an external source feed such as Rotten Tomatoes. One example is to record a link related to the latest release date and opening theater for movie "Inception". Furthermore, frequently, each sub-system does not provide a complete view of its metadata, for example, since metadata recording may be enhanced over time as new monitoring and debugging needs emerge. Recording all metadata at the finest possible granularity sometimes imposes unacceptable burden and performance overheads on both a system that produces the metadata and the system that captures and stored the metadata.

Provenance metadata management has been studied in the database and scientific workflow literature, including the notion of offering provenance management as a first-class service, distinct from data and process management. However, most prior work on provenance has focused on tracking a single system's provenance metadata, and consequently has generally assumed that provenance metadata is rather uniform, and/or can be tightly coupled to the data in one system. But in actuality, this is hardly the case. Therefore, there is a need to provide a framework for integrated management of provenance metadata that spans a rich, multi-dimensional granularity hierarchy.

SUMMARY

The teachings disclosed herein relate to methods, systems, and programming for content processing. More particularly, the present teaching relates to methods, systems, and programming for heterogeneous data management.

In one example, a method, implemented on a machine having at least one processor, storage, and a communication platform connected to a network for heterogeneous data management. Via the communication platform, information from a plurality of data sources is first obtained. A data/metadata modeling unit models the data/metadata from each of the data sources based on provenance and/or granularity information associated with the data/metadata to generate data/metadata models. A data/metadata integration unit integrates the data/metadata from the plurality of data sources by applying one or more processes to the data/metadata from different data sources in accordance with the data/metadata models to generate integrated data/metadata. A provenance representation generator creates a provenance representation of the integrated data/metadata that traces sources, granularities, and/or processes applied to generate the integrated data/metadata. When a data/metadata manager receives a query originating from a user, regarding information associated with the integrated data/metadata, it provides a response directed to the query derived based on the provenance representation of the integrated data/metadata.

In another example, a method, implemented on a machine having at least one processor, storage, and a communication platform connected to a network, for generating a data provenance representation. Via the communication platform, information from a plurality of data sources is first obtained. A data/metadata modeling unit models the data/metadata from each of the data sources based on a source and/or granularity information associated with the data/metadata to generate data/metadata models. A data/metadata integration unit integrates the data/metadata from the plurality of data sources, by applying one or more processes to the data/metadata from different data sources in accordance with the data/metadata models, to generate integrated data/metadata. A provenance representation generator creates a provenance representation of the integrated data/metadata that traces sources, granularities, and/or processes applied to generate the integrated data/metadata and archives the provenance representation of the integrated data/metadata for enabling an query associated with the integrated data/metadata on source and/or granularity.

In a different example, a method, implemented on a machine having at least one processor, storage, and a communication platform connected to a network, for processing a data provenance query. A data/metadata manager enables an access to an archive storing one or more provenance representations of integrated data/metadata, where each data provenance representation traces sources, granularities, and/or any process applied to data/metadata from different sources that are used to generate the integrated data/metadata. Via the communication platform, the data/metadata manager receives a query originated from a user regarding information associated with the integrated data/metadata. The query is analyzed to determine information queried and the archive is accordingly accessed to retrieve at least one provenance representation. The queried information is then extracted from the at least one provenance representation and a response to the query is then generated based on the queried information.

In a different example, a system for heterogeneous data management is presented, which comprises a heterogeneous data/metadata input unit, a data/metadata modeling unit, a data/metadata integration unit, a provenance representation generator, and a data/metadata manager. The heterogeneous data/metadata input unit is configured for obtaining, via a communication platform, information from a plurality of data sources. The data/metadata modeling unit is configured for modeling the data/metadata from each of the data sources based on source and/or granularity information associated with the data/metadata to generate data/metadata models. The data/metadata integration unit is configured for integrating the data/metadata from the plurality of data sources, by applying one or more processes to the data/metadata from different data sources in accordance with the data/metadata models, to generate integrated data/metadata. The provenance representation generator is configured for creating a provenance representation of the integrated data/metadata that traces sources, granularities, and/or processes applied to generate the integrated data/metadata and the data/metadata manager is configured for receiving a query, originated from a user, regarding information associated with the integrated data/metadata and providing a response directed to the query based on the provenance representation of the integrated data/metadata.

Other concepts relate to software for implementing the generation of explanations for relationships. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine readable and non-transitory medium having information recorded thereon for heterogeneous data management recorded thereon, wherein the information, when read by the machine, causes the machine to perform a series of steps. Via the communication platform, information from a plurality of data sources is first obtained. The data/metadata from each of the data sources are modeled based on source and/or granularity information associated with the data/metadata to generate data/metadata models. The data/metadata from the plurality of data sources are then integrated by applying one or more processes to the data/metadata from different data sources in accordance with the data/metadata models to generate integrated data/metadata. A provenance representation of the integrated data/metadata is then created that traces sources, granularities, and/or processes applied to generate the integrated data/metadata so that when a query originated from a user is received regarding information associated with the integrated data/metadata, a response directed to the query can be provided based on the provenance representation of the integrated data/metadata.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 9 is a flowchart of an exemplary process in which provenance representations are used to enable queries, according to an embodiment of the present teaching.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of data provenance management, especially in the environment where data and metadata can be accessed from heterogeneous data sources or systems, having potentially different granularities. The data provenance method and system as disclosed herein aim at reducing manual effort to track data across sub-systems. Method and systems designed to achieve such a goal are capable of modeling data/metadata from heterogeneous sources in a way so as to preserve or track information such as source of data, granularity, and the process of data transformation to enable flexible processing of subsequent queries in association with the source, granularity, and processing applied to the data during the transformation.

Motivated by this challenge, the present teachings presented herein provide a system or service that collects, integrates, and enables queries on data/metadata/process of different granularities associated with different sub-systems in a coherent data management environment. While each sub-system continually uploads data/metadata to a system as described herein, users can rely on the disclosed present teachings for data/metadata-related inquiries. Such a coherent system benefits users in several ways. First, users are provided with an integrated view of data/metadata from different systems and can query via a uniform query interface. Second, boilerplate code for storing and accessing metadata is factored out of multiple data processing sub-systems, into one place. Moreover, the lifespan of the metadata is decoupled from that of the data to which it refers, and even from the lifespans of the various data processing sub-systems.

Figure 1:
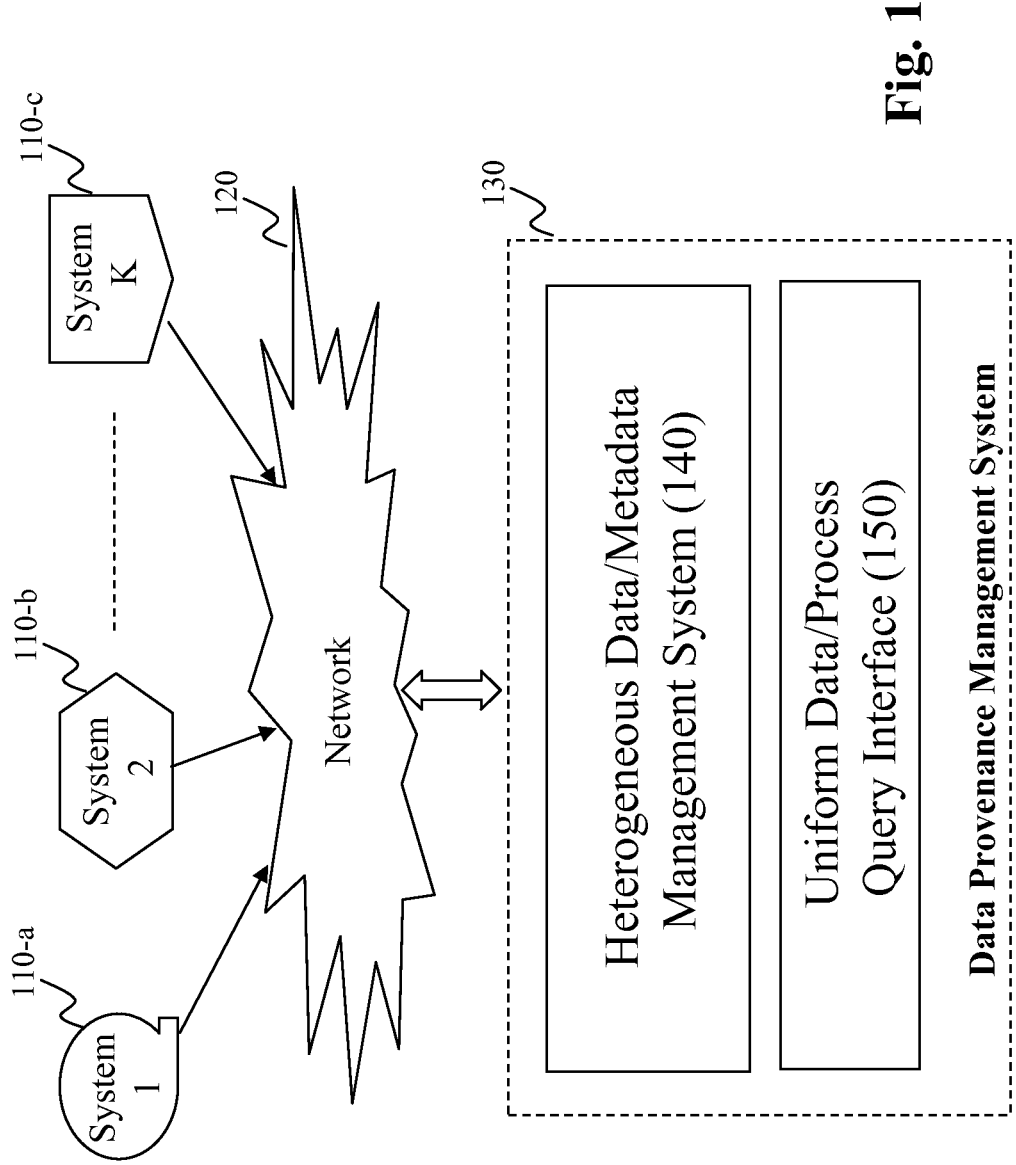
FIG. 1 is a high level depiction of an exemplary overall structure of heterogeneous data management, according to an embodiment of the present teaching.

FIG. 1 is a high level depiction of an exemplary overall structure 100 of a data provenance management system, according to an embodiment of the present teaching. In this exemplary system 100, a data provenance management system 130 is connected to a plurality of data sources or data processing systems, system 1 110-a, system 2 110-b, . . . , and system K 110-c via a network 120. Each specific type of data source may further have multiple sub-sources. For instance, system 1 110a may correspond to a live feed which can further have multiple sub data sources such as blogs, tweets, . . . , or FaceBook. Information from different data sources may be accessed or delivered to the data provenance management system 130 via network connections. The network 120 in such a context can be a single network or a combination of different networks. For example, network 120 can be a local area network (LAN), a wide area network (WAN), a public network, a private network, a proprietary network, a Public Telephone Switched Network (PSTN), the Internet, a wireless network, a virtual network, or any combination thereof. A network may also include various network access points, e.g., wired or wireless access points such as base stations or Internet exchange points, through which a data source may connect to the network in order to transmit information via the network. The data provenance management system 130 includes a heterogeneous data/metadata management system 140, which receives, processes, integrates data/metadata from different sources and archives relevant information to enable subsequent queries, and a uniform metadata query interface 150, which processes queries on data/metadata.

Figure 2:
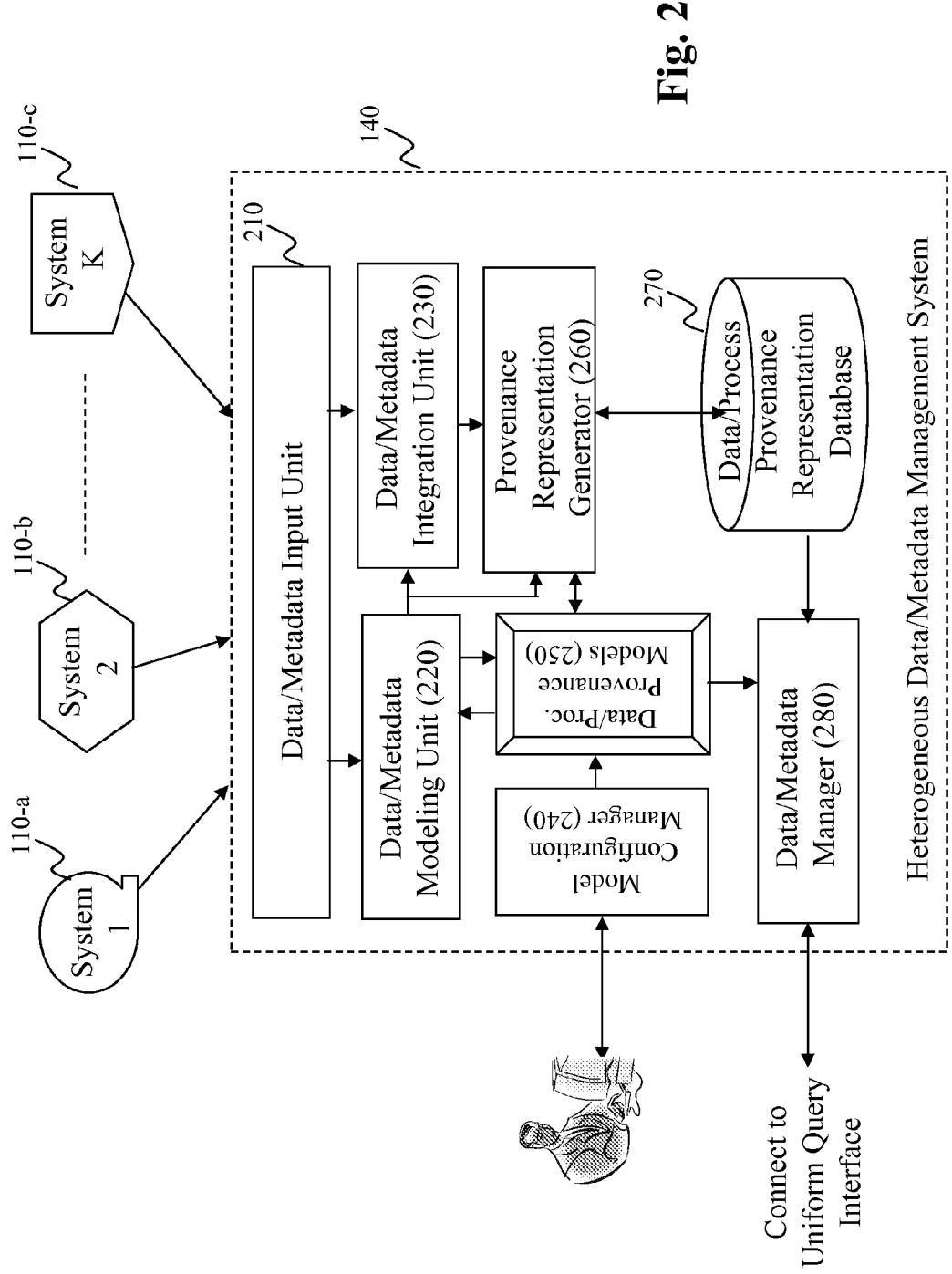
FIG. 2 is a high level depiction of an exemplary heterogeneous data/metadata management system, according to an embodiment of the present teaching.

FIG. 2 shows a more detailed high level exemplary system diagram of the heterogeneous data/metadata management system 140, according to a first application embodiment of the present teaching. In this exemplary embodiment, the heterogeneous data/metadata management system 140 comprises a data/metadata input unit 210, a data/metadata modeling unit 220, a data/metadata integration unit 230, a provenance representation generator 260, and a data/metadata manager 280. The data/metadata input unit 210 may be responsible for connecting to the network 120 for receiving data/metadata from heterogeneous data sources system 1 110a, system 2 110-b, . . . , system K 110-c. The data/metadata input unit 210 may be equipped with the capability of handling different data/metadata formats and different communication protocols in order to effectively communicate with heterogeneous systems 110a, . . . , 110-c.

The data/metadata modeling unit 220 may be responsible for analyzing the input data/metadata forwarded from the data/metadata input unit 210. Based on the information received, the data/metadata modeling unit 220 may make determinations, with respect to data/metadata from each individual data source, as to the nature of the data/metadata, e.g., its source, granularity, attributes, etc. To facilitate that, the heterogeneous data/metadata management system 140 may provide data/process provenance models 250, which model both the data and process of different granularities and how they are related to each other. Based on such models, the data/metadata modeling unit 220 models the data/metadata from individual sources based on the content, which can later be used by the data/metadata integration unit 230 to determine how data/metadata from different sources may be integrated.

Figure 3A:
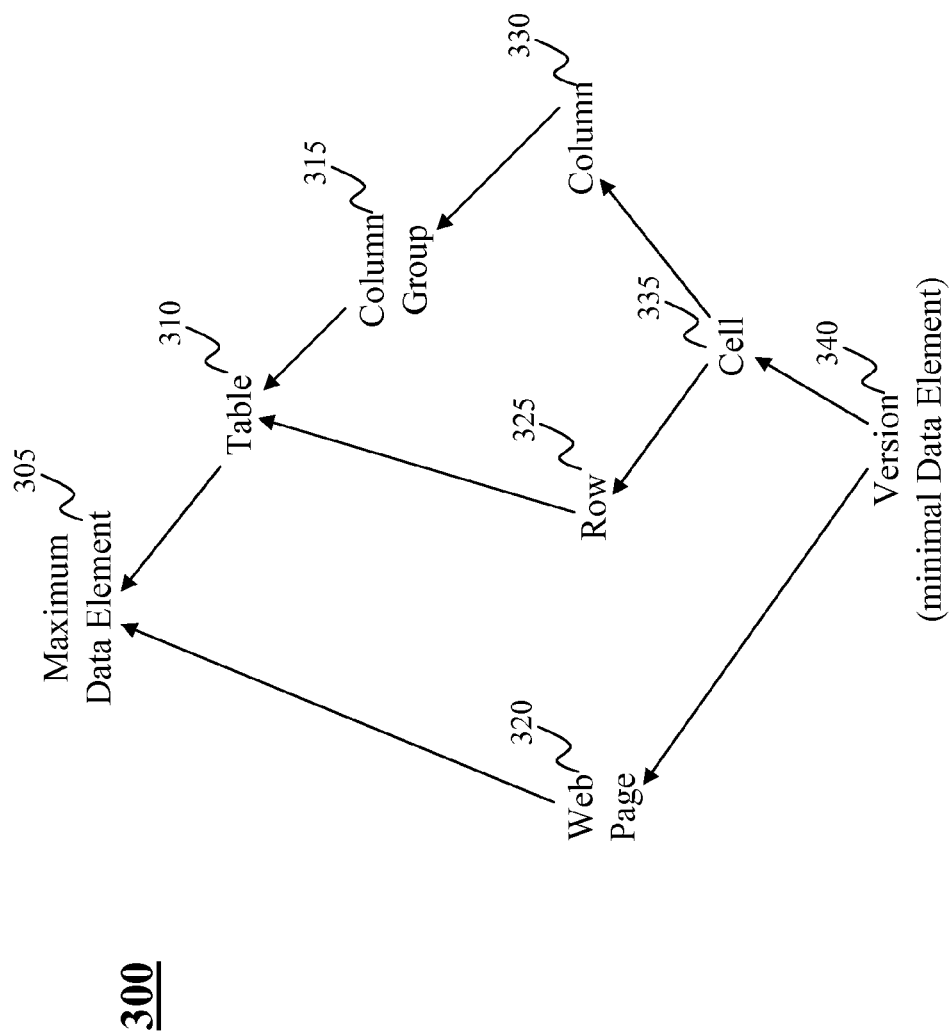
FIGS. 3(a)-3(b) are exemplary data/process multi-layer hierarchies representing data/metadata/process of different granularities, according to an embodiment of the present teaching.

FIG. 3(a) is an exemplary data granularity model 300 representing data of different granularities and how they relate to each other, according to an embodiment of the present teaching. In this exemplary model 300, a data element 305 is either part of a relational table 310 or a free-form web page 320. A relational table is usually divided horizontally into rows 325, and vertically into column groups 315, each of which is further subdivided into columns 330. A row/column combination is a cell 335. Each table cell may have multiple versions of data (340), e.g. reflecting multiple conflicting possible data values, or temporally changing values. Each web page may also have different versions (340), e.g., corresponding to multiple crawled snapshots.

Figure 3B:
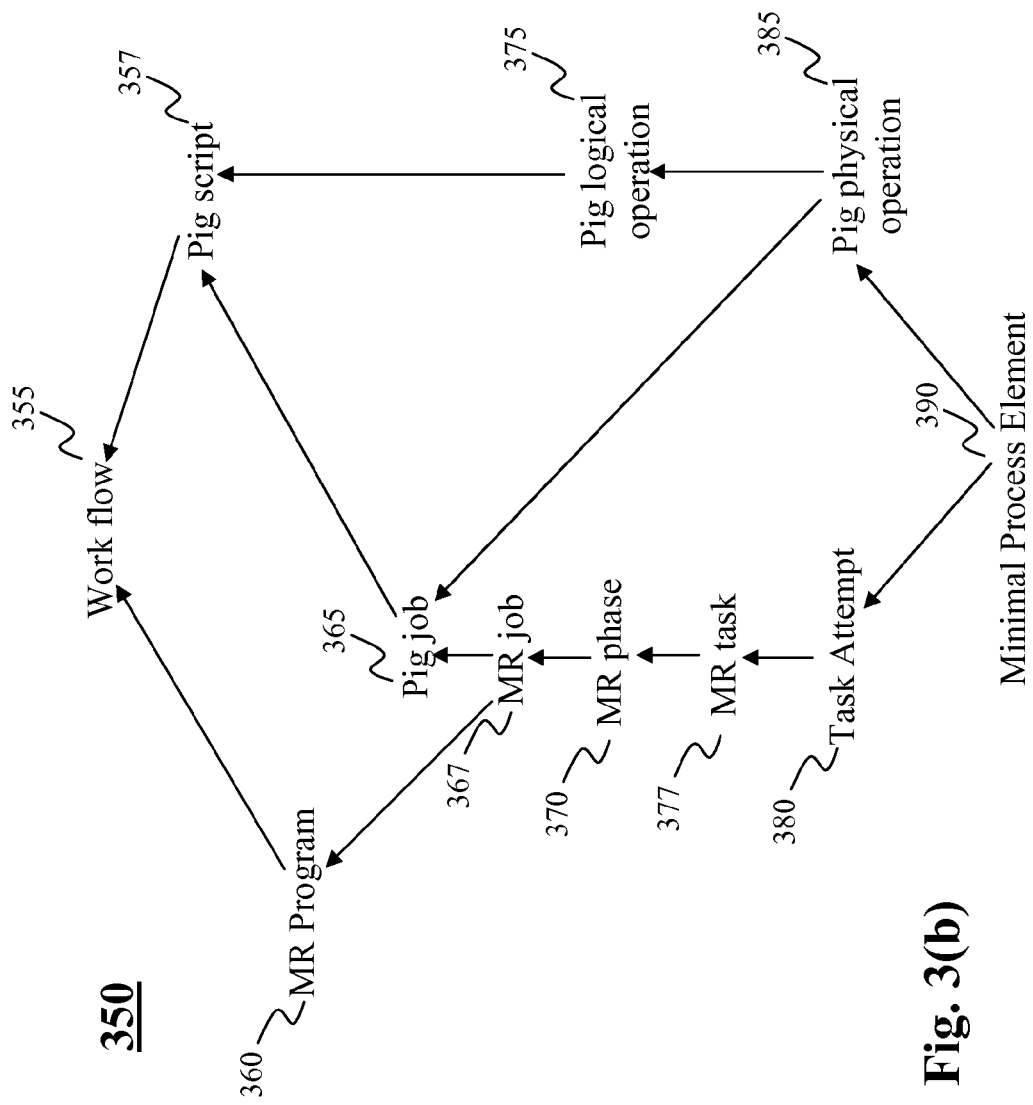

FIG. 3(b) is an exemplary process granularity model 350 representing processes of different granularities, according to an embodiment of the present teaching. As illustrated in this exemplary process granularity model, data processing, at the coarsest granularity, is driven by a workflow 355, which, in this exemplary embodiment, includes either map-reduce (MR) programs 360 or pig scripts 357 (Pig is a declarative language on top of map-reduce). An execution of a pig script can be a pig job 365. A pig job may include a series of map-reduce jobs 367, which are in turn broken into phases 370, e.g., two phases corresponding to a map phase and a reduce phase. Each phase is partitioned into different (e.g., map or reduce) tasks 377, which undergo one or more instantiated executions 380.

Syntactically, a pig script may also include sequences of logical operations 375. Each pig logical operation may include sequences of physical operations 385, which carry out the operations inside the map/reduce task attempts. Pig physical operations 385 and/or task execution attempts 380 constitute the minimal process elements 390 in this illustrated process granularity model. In general, when data or metadata are received from a data source, the data/metadata modeling unit 220 establishes a new instance for the data/metadata based on, e.g., the data/process provenance models 250. For example, each new instance may be configured or generated based on one data granularity model, reflecting the granularity of the data received in accordance with the data granularity model 250, and one process granularity model, reflecting the granularity of the process(es) applied to derive the data. In generating a new instance, if unique maximal and minimal elements are absent from either data or process, the system as disclosed herein may be used to automatically create such elements, e.g., the <Maximal Data Element> 305 and/or the <Minimal Process Element> 390 in FIGS. 3(a) and 3(b).

In the models shown in FIGS. 3(a) and 3(b), there are various basic elements forming the models. Each basic element may be an atomic unit of a data or process element and may be specified by a variety of attributes such as a unique identifier, a particular granularity, and one or more basic elements that are direct parents to the basic element in the model hierarchy. For example, the parent basic elements of a basic element may represent basic elements with coarser-granularities. This example expresses the notion of a containment relationship among basic elements. Given two basic elements B1 and B2, B1 contains B2 if and only if either the identifier of B1 is contained in a list of basic elements specified as the direct parents of B2 or there exists a basic element B in a list of basic elements specified as the direct parents of B2 such that B1 contains B. Intuitively, B2 is contained in B1 if B1 is a direct parent (i.e., coarser granularity element) or an ancestor in the granularity hierarchy, as shown in FIG. 3(a) or 3(b).

Based on the above definitions, the notion of "granularizing" basic elements can be defined to the finest possible granularity. This is a concept that can be used subsequently to infer new relationships among elements. Granularization of a given basic element is defined to include all basic elements to the finest granularity contained in the given element. Formally, given basic element B=(g, ID, P), where g represents the granularity of element B, ID is its identifier, and P is a list of direct parent elements of B, and minimal element $g_{min}$ in a model hierarchy containing g, the granularization of B, denoted as G(B), is a set defined by $\{b'=(g_{min}, ID', P'): B$ contains $B'\}$.

The concept of complex element types and complex elements allows composition of multiple elements from multiple basic elements of different granularities. First, a complex element type can be defined as follows. A complex element type $T=\{g_1, g_2, \ldots, g_n\}$ is a set of granularities such that all member elements of the complex element type T are from the same granularity hierarchy (e.g., either a data granularity hierarchy as shown in FIG. 3(a) or a process granularity hierarchy as shown in FIG. 3(b), i.e., all data granularities or all process granularities) and no two member elements $g_i$, $g_j$ in T relate to each other by a containment relationship. An example of a complex element type is {row, column group}, which defines a data element defined by the intersection of a particular row and a particular column group. Each complex element type may have an associated attribute set indicating various features associated with the member elements.

An instantiation of a complex element type is a complex element. An example complex element can be denoted as E=(ID, T, {B1, B2, . . . , Bk}), where ID is the identifier of the complex element, T indicates the complex element type, and {B1, . . . , Bk} are the basic elements that compose the complex element E. An example instantiated complex element is (8, {row, column group}, {row 5, column group 3}). One can also define the concept of granularization of a complex element E as $G(E)=\cap_{1 \leq i \leq k} G(Bi)$, i.e., the AND of the granularizations of the basic elements contained in the complex element.

Figure 5:
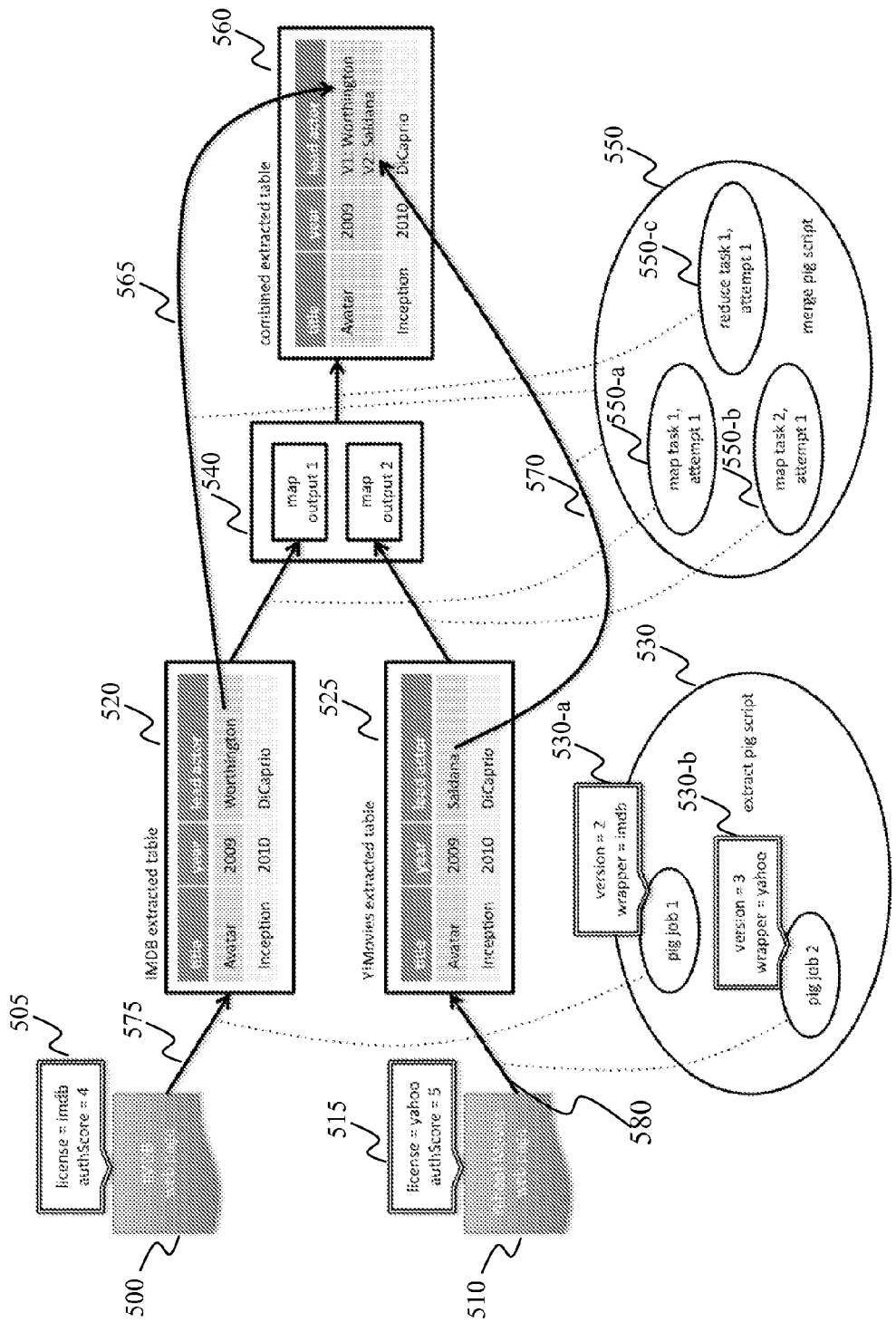
FIG. 5 shows an exemplary provenance representation for integrated data/metadata, according to an embodiment of the present teaching.

Based on the concepts described above, the data/metadata modeling unit 220 analyzes the data/metadata received and identifies basic and/or complex elements contained in the data/metadata from each individual data source. Based on such information, the data/metadata integration unit 230 may integrate certain basic element or complex elements from different data sources to generate integrated data/metadata by applying certain processes on data/metadata. FIG. 5 shows a data/process provenance representation generated based on an example integrated data/metadata in accordance with an embodiment of the present teaching. In FIG. 5, complex element 520 of type {row, column group} is extracted from metadata received from data source 500 (IMDB Web Page) and a complex element of type {row, column group} is extracted from metadata received a different data source 510 (Yahoo! Movie Web Page). The two complex elements from different data sources have their own distinct attributes, including the source of the information and granularities, and their own values. For example, the complex element from data source 500 has lead actor "Worthington" but the complex element from data source 510 has lead actor "Saldana". In this example, the complex elements (metadata) from data sources 500 (IMDB Web Page) and 510 (Yahoo! Movie Web Page) are combine to create the integrated metadata 560, which provides information on lead actor obtained from both data sources ("Worthington" and "Saldana").

To create the integrated data/metadata 560, certain processes are applied. For instance, specific complex elements are extracted from both data sources. Specifically, an "extract pig script" 530 is applied to the metadata from each individual data source, i.e., pig job 1 530-a is executed to extract the complex elements 520 corresponding to movies "Avatar" and "Inception" from the metadata from the IMDB Web Page 500 and pig job 2 530-b is executed to extract the complex elements 525 corresponding to movies "Avatar" and "Inception" from the metadata from Yahoo! Movie Web Page 510. To integrate the metadata from both data sources, different processing is applied to the information from different sources. In this illustrated example, map and reduce operations are applied, e.g., complex elements corresponding to the same movie in different metadata are first mapped to an intermediate complex element 540 via two map tasks 550-a and 550-b, executions of which create the intermediate result 540. To merge the mapped information from different metadata, a reduce operation 550-c is applied and the execution of the reduce operation merges the two complex elements in the intermediate result corresponding to the same movie to yield the integrated metadata 560. In addition, during the integration, the source of information is tracked via links 565, 570, 575, and 580. For example, information indicating the source of lead actor "Worthington" traces back to the complex element 520, which can then be traced back to data source 500. Similarly, information indicating the source of lead actor "Saldana" traces back to complex element 525, which can then be traced back to data source 510. Note that in the integrated metadata in this example, there are inconsistencies in the value for "lead actor" and such inconsistencies have been preserved in the provenance representation illustrated in FIG. 5 (stored as alternative versions of cells in the integrated metadata. In addition, the sources of the inconsistencies are also tracked (see links 565 and 570) so that whenever there are inquiries regarding such inconsistencies, the sources of the problem can be traced back.

As shown in FIG. 5, the exemplary provenance representation is constructed as a graph. Formally, in such a graph, a vertex in such a graph is defined as $V=(ID, T, \{e_1, e_2, \ldots, e_k\}, \{v_1, v_2, \ldots, v_m\})$, where ID is an identifier, T specifies a complex element type, $e_i$, $1 \leq i \leq k$, is the identifier of the complex element $e_i$ of type T, and $v_j$, $1 \leq j \leq m$, is a value for each attribute in T's attribute set. Each vertex represents the union of a set of complex data or process elements of a given type. An exemplary case involving sets of size one (k=1) may be (12, {row, column group}, {8}, {owner "Jeff", location "Singapore data center"}). Another example with k=2 without attribute values may be (14, {MR task}, {9, 10}, { }), where 9 and 10 refer to complex elements (9, {map task}, {map task 1}) and (10, {map task}, {map task 2}), respectively.

FIG. 5 has one vertex with k=2: the data structure 540 having elements "map output 1" and "map output 2". Most vertices in FIG. 5 have no attributes. There are two types of vertices in FIG. 5 that have attributes. One is elements 500 and 510 (both are web pages) with attributes relating to "license" and "authority score". The other type is the process element "extract pig jobs", corresponding to 530-*a* and 530-*b*, having attribute set ("version of extract script used", "wrapper parameters"). The attribute values for these two elements are ("version 2", "IMDB") and ("version 3", "Yahoo"), respectively.

In the exemplary provenance representation shown in FIG. 5, connections among graph vertices take the form of three-way ($d_1$, p, $d_2$) relationships, denoting that process element p produced data element $d_2$ by reading data element $d_1$. More particularly, at least part of process p produced $d_2$ by reading at least part of $d_1$. In addition, each provenance relationship ($d_1$, p, $d_2$) in FIG. 5 is shown as a dark arrow (link between $d_1$ and $d_2$) combined with a light dotted arrow (link to process p). The provenance relationships on the left-hand side of FIG. 5 correspond to coarse-grained in terms of data links, and semi-coarse-grained in terms of process links (pig jobs that ran a particular version of the pig script called "extract," with a particular web page wrapper). The provenance relationships on the right-hand side involve two granularities: (1) the fine-grained links from data cells in the IMDB and Yahoo! Movies tables to cell versions in the combined extracted table with coarse-grained references to the "merge" pig script, and (2) coarse-grained links from the IMDB and Yahoo! Movies tables to the combined extracted table (via intermediate map output files), with fine-grained references to the specific map and reduce task attempts that handled the data.

In some embodiments, the present teaching makes an open-world assumption about the data/metadata it manages. The open-world semantics can be formally defined as follows. Let M denote the data/metadata currently configured or registered with the heterogeneous data provenance management system 140. M may encode a set F of facts, such as the known set of data and process elements, their containment relationships, and the known provenance linkages. The present teaching may assume that F is correct but (possibly) not complete, i.e. there exists some true world set of facts F' which contains F. Let $F_E$ denote the set of facts that can be derived or inferred from F so that the inferred facts are guaranteed to be part of any true world set of facts F' and consistent with F, i.e., F is contained in $F_E$, which is also contained in F'. That is, $F_E$ includes all certain facts, analogous to certain answers in standard open-world semantics.

The provenance representation constructed in accordance with the present teaching allows the generation or inference of $F_E$ based on F. Examples of facts in $F_E$ that are not in F include inferred containment relationships for complex elements, and transitively inferred provenance links. As an example of a fact that may be in F' but is not in $F_E$, suppose F includes the fact that "process p emitted row $r_1$", "process p emitted row $r_2$" and "$r_1$ and $r_2$ are part of table T". In this case, although F defines no other rows in T except $r_1$ and $r_2$, the assertion "process p emitted the entire table T" cannot be included in $F_E$ because of the possibility that T may contain additional rows that are included in the true world fact set F'.

The inferred fact set $F_E$ enables the data/metadata manager 280 in the heterogeneous data management system 140 to handle queries based on facts inferred from known facts F. That is, answering a query Q may be a two step operation: (1) deriving $F_E$, and (2) responding to Q by performing a, e.g., "lookup" operation with respect to $F_E$.

There are a number of exemplary relationships that can be inferred or reasoned based on the provenance representation as illustrated in FIG. 5. For example, one relationship that can be inferred using granularity-spanning data/metadata is a predicate called "under", which determines whether the data or process element described by one vertex, say V1, is contained in the element described by another vertex, say V2. For example, in FIG. 5, the cell containing "Worthington" is contained in or under the "lead actor" column (in the IMDB extracted table 520), which in turn is under the IMDB extracted table 520.

Other exemplary relationships that may be inferred based on a fact set $F_E$ derived from a provenance representation include "feeding", "emitting", and "influencing". The inferred or reasoned relationship "feeding" indicates that at least part of data element d feeds a process p. The capability of inferring a "feeding" relationship can be utilized to address a query phrased like "given data element d and process element p, does (part of) data d feed (part) of process p?". In the exemplary provenance representation shown in FIG. 5, from the relationship (IMDB web page, pig job 1, IMDB extracted table), the heterogeneous data management system 140 may infer that (part of) "IMDB web page" feeds (part of) "extract pig script". As another example, from the relationship (Worthington, merge pig script, V1:Worthington), the heterogeneous data management system 140 may infer that (part of) "row (Avatar, 2009, Worthington)" feeds (part of) "merge pig script".

The inferred or reasoned relationship "emitting" indicates that at least part of a process element p emits at least part of data element d. The capability of inferring an "emitting" relationship allows the heterogeneous data management system 140 to address a query phrased like "given data element d and process element p, does (part of) process element p emit (all of) data element d?". For example, from the relationship (IMDB web page, pig job 1, IMDB extracted table), the heterogeneous data management system 140 may infer that (part of) "extract pig script" emits (all of) "IMDB extracted table", and (part of) "pig job 1" emits (all of) "row (Avatar, 2009, Worthington)".

Similarly, the capability of inferring the "influencing" relationship enables the heterogeneous data management system 140 to handle a query phrased like "given two data elements d1 and d2, does (part of) d1 influence (all of) data element d2, either directly (influences(1)) or indirectly (influences(k))?". In the exemplary provenance representation shown in FIG. 5, the "influencing" relationship may include two variations, one is "direct influencing" and another is "indirectly influencing". For instance, one illustration of a "direct influencing" relationship exists between data element "IMDB extracted table" 520 and data element "row (Avatar, 2009, Worthington)". That is, data element "IMDB extracted table" 520 directly influences all of data element "row (Avatar, 2009, Worthington)" or "IMDB extracted table" 520 influences(0) ("0" here means "directly") (all of) data element "row (Avatar, 2009, Worthington)". However, "IMDB Web Page" 500 indirectly influences the lead actor column of the IMDB extracted table 520. Specifically, "IMDB Web Page" 500 influences (1) all of the lead actor column of the IMDB extracted table 520. Moreover, "IMDB Web Page" 500 also indirectly (but with a different degree) influences the value of the lead actor "Worthington" in the IMDB extracted table 520 or "IMDB Web Page" 500 influences (2) all of "V1: Worthington" in the lead actor column of the IMDB extracted table 520.

In some embodiments, certain query language may be designed that allows a user to express an inquiry directed to a specific relationship between or among different data/process elements. Inquiries may be formed and sent via the uniform data/process query interface 150 to the data/metadata manager 280. Modules performing parsing and/or syntactic aspects of the query language may be developed within the data/metadata manager to understand the nature of each query and process the query accordingly. Any techniques, including those existing or developed in the future, may be employed to implement the query capabilities of the heterogeneous data management system 140. Due to the expressive power of the provenance representation, the heterogeneous data management system 140 is capable of addressing and handling various aspects of the heterogeneous data management in a way that traditional systems have not been able to.

Referring back to FIG. 2, the data/metadata modeling information from the data/metadata modeling unit 220, the integrated data/metadata generated by the data/metadata integration unit 230, and the tracking information associated with the processes applied to the data/metadata from different data sources to derive the integrated data/metadata are forwarded to the provenance representation generator 260, which creates a data/process provenance representation, e.g., the one shown in FIG. 5, for the integrated data/metadata 560. As discussed herein, through this provenance representation, various queries may be enabled and supported. For example, a user may inquire about where the information about lead actor "Worthington" is coming from. Via the provenance representation shown in FIG. 5, a response can be derived by identifying the source of information by tracing the provenance representation. Similarly, various inquiries regarding the granularities of information at different levels of details can be handled by looking up the provenance representation such as the one shown in FIG. 5.

The data/process provenance representations generated by the provenance representation generator 260 are stored in a data/process provenance representation storage 270. Such stored information may later be accessed by the data/metadata manager 280 in responding to different queries about the source, granularity, and process applied to each piece of data/metadata. The data/metadata manager 280 interfaces with the uniform data/metadata query interface 150 shown in FIG. 1. For instance, when a user is viewing information from the integrated data/metadata 560 (see FIG. 5), the user may send a query inquiring about the source of the information on a particular lead actor. The uniform data/metadata query interface 150 may display the integrated data/metadata to the user and receive any inquiry from the user. Upon receiving an inquiry, the uniform data/metadata query interface 150 may forward the query to the data/metadata manager 280, which may then analyze the query, retrieve relevant information from the data/process provenance representation storage 270 by identifying specific provenance representation, obtaining relevant information by tracing the provenance representation, forming a response to the query, and sending the response to the uniform data/metadata query interface 150.

In some embodiments, the provenance representation generator 260 creates a data/process provenance representation based on the data/process provenance models 250, which define the granularity hierarchy in terms of both data and processes. The heterogeneous data/metadata management system 140 may also be designed to have a model configuration manager 240, which is capable of interacting with a human operator to dynamically configure the data/process granularity hierarchies (shown in FIGS. 3(*a*) and 3(*b*)) based on application needs, system upgrades, or advancement of technologies. When this occurs, the data/metadata modeling unit 220, the data/metadata integration unit 230, and the provenance representation generator 260 can accordingly adapt in accordance with the adaptively configured data/process provenance models 250.

Figure 4:
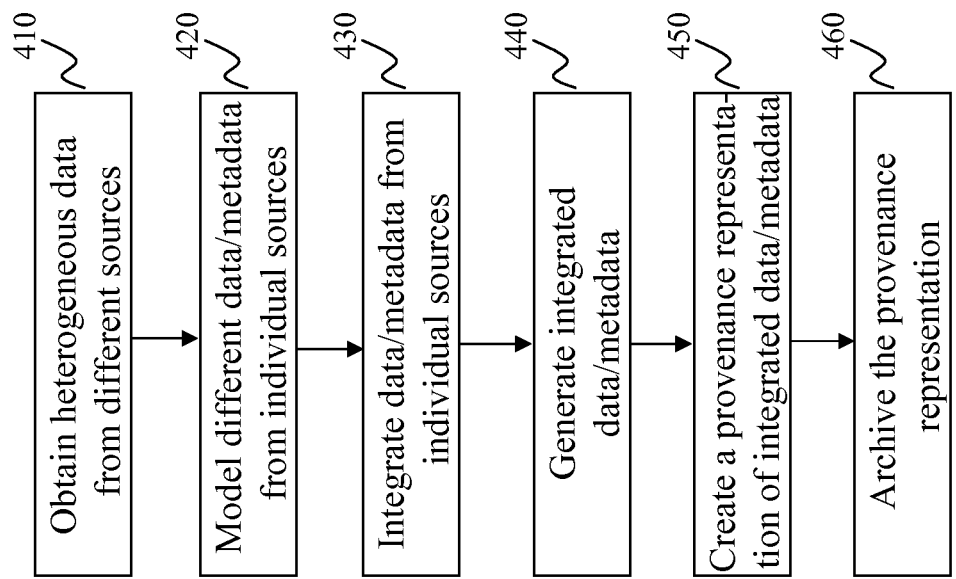
FIG. 4 is a flowchart of an exemplary process of a heterogeneous data/metadata management system, according to an embodiment of the present teaching.

FIG. 4 is a flowchart of an exemplary process of the heterogeneous data/metadata management system 140, according to an embodiment of the present teaching. Data/metadata from heterogeneous data sources are first obtained, at step 410, via the data/metadata input unit 210. For data/metadata from individual data sources, the data/metadata modeling unit 220 generates, at 420, models for data/metadata from each source based on the data provenance model 250. Based on the modeled data/metadata from different sources, the data/metadata integration unit 230 integrates, at 430, data/metadata from different sources to generate, at 440, integrated data/metadata. For instance, for a movie, the video data of different resolutions (granularities) from different data sources may be integrated to create a video with a combined resolution and the data/metadata associated with the movie may also be combined to create an integrated data/metadata that has more information than any of the data/metadata from the original sources. Information related to how the data and metadata are processed and integrated is kept and used to create, at 450, the data/process provenance representation. Such created data/process provenance representations are then archived, at 460, for future use.

Figure 6A:
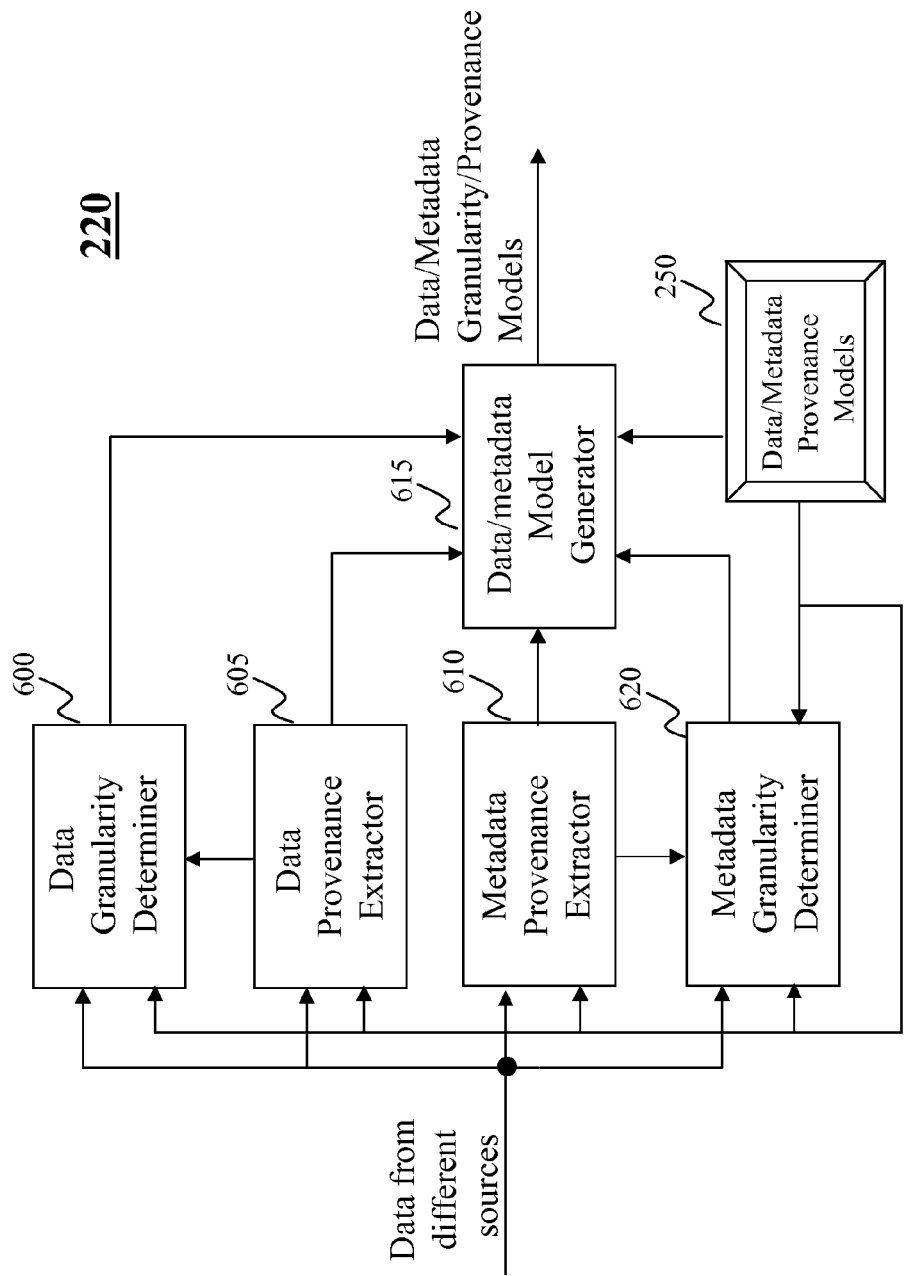
FIG. 6(a) depicts an exemplary system diagram of a data/metadata modeling unit, according to an embodiment of the present teaching.
Figure 6B:
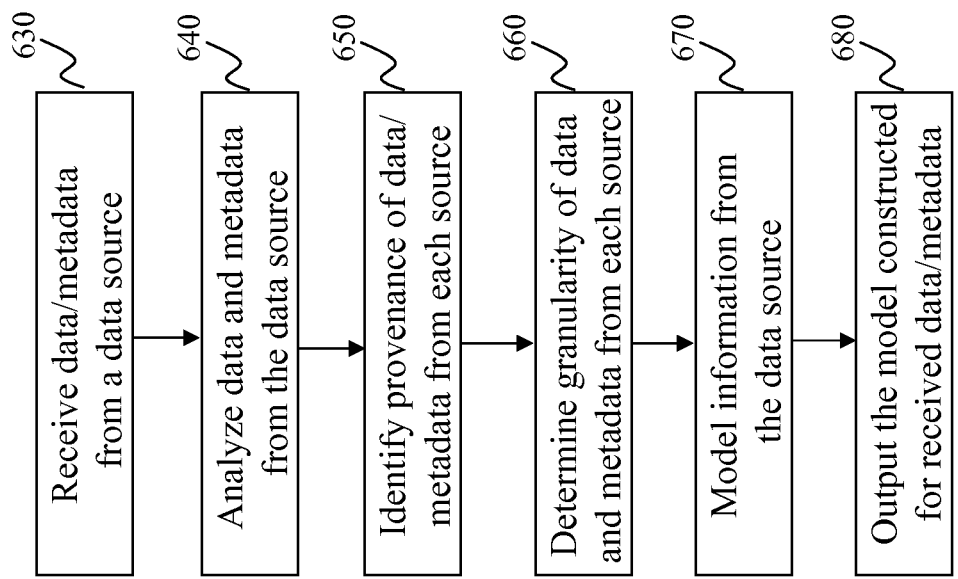
FIG. 6(b) is a flowchart of an exemplary process in which data/metadata from a data source is modeled, according to an embodiment of the present teaching.

FIG. 6(*a*) depicts an exemplary system diagram of the data/metadata modeling unit 220, according to an embodiment of the present teaching. In this exemplary embodiment, the data/metadata modeling unit 220 comprises a data granularity determiner 600, a data provenance extractor 605, a metadata provenance extractor 610, a metadata granularity determiner 620, and a data/metadata model generator 615. When data/metadata from a certain data source are received, the data granularity determiner 600 processes the data and makes a determination of the granularity of the data in accordance with the data granularity hierarchy expressed in the data provenance model 250. On the other hand, the provenance information of the received data is extracted by the data provenance extractor 605 from the received data. Similarly, the metadata granularity determiner 620 processes the received metadata and makes a determination of the granularity of the metadata in accordance with the metadata granularity hierarchy expressed in the metadata provenance model 250. On the other hand, the provenance information of the received metadata is extracted by the metadata provenance extractor 610 from the received metadata. The granularity and provenance information with regard to the data and metadata received is then used by the data/metadata model generator 615 to generate a data/metadata granularity/provenance model. The generation of such a model for the received data/metadata is based on the configured data granularity hierarchy in the data/metadata provenance models 250.

FIG. 6(*b*) is a flowchart of an exemplary process in which data/metadata from a data source is modeled, according to an embodiment of the present teaching. Data/metadata from a particular data source are first received at 630. The data and metadata from the data source are then analyzed at 640. The provenance information of the data and metadata is identified, at 650, based on the analyzed result. The granularity of the data and metadata from the data source is then accordingly determined at 660. The extracted provenance information and granularity information are then used to model, at 670, the data/metadata received to generate the data/metadata provenance/granularity model, which is then output, at 680, for the additional processing.

Figure 7A:
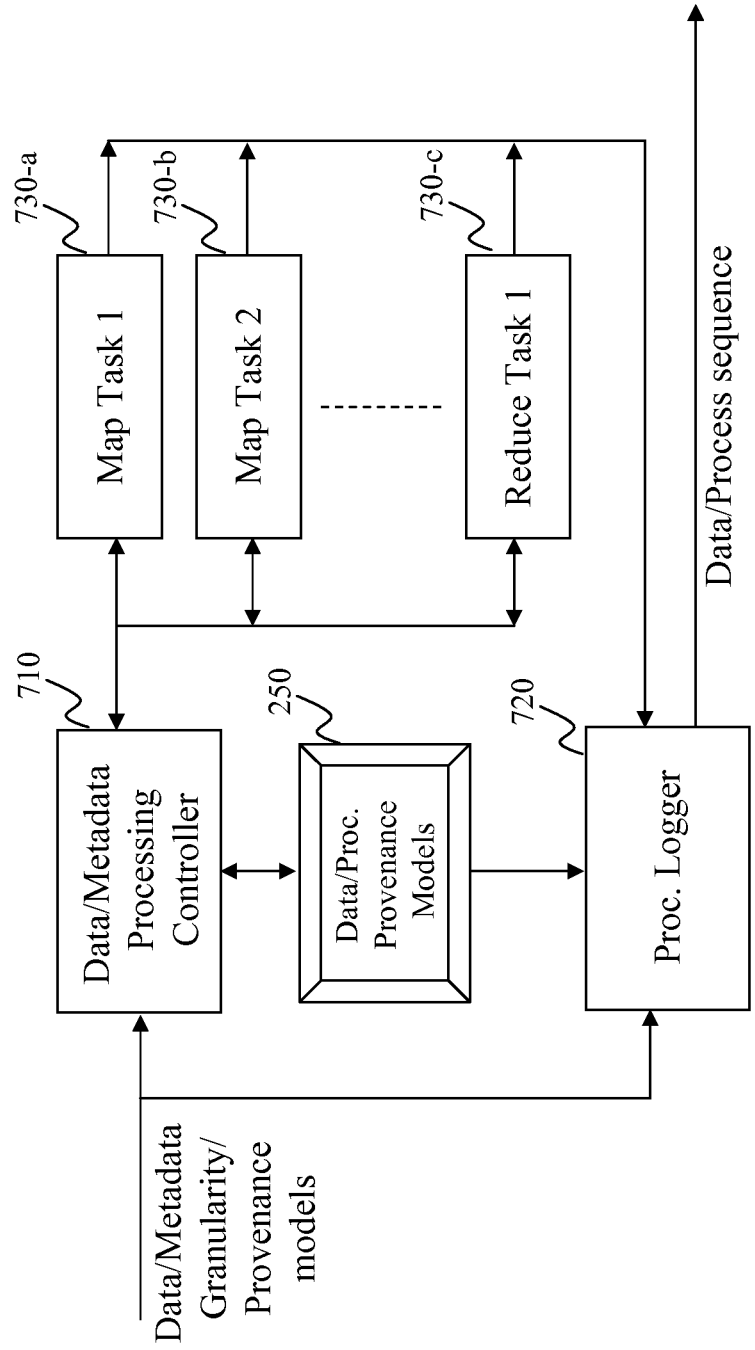
FIG. 7(a) depicts an exemplary system diagram of a data/metadata integration unit, according to an embodiment of the present teaching.

FIG. 7(a) depicts an exemplary system diagram for the data/metadata integration unit 230, according to an embodiment of the present teaching. The exemplary data/metadata integration unit 230 comprises a data/metadata processing controller 710, a plurality of processing units (e.g., map task 1 730-a, map task 2 730-b, . . . , reduce task 730-c), each of which may be designed to apply an operation to a particular basic element or complex element associated with data or metadata, and a processing logger 720, which may be designed to record any operation applied to any data/metadata elements. The data/metadata processing controller 710 is the central unit of the data/metadata integration unit 230. It determines, based on application needs and the configured data granularity hierarchy and process granularity hierarchy (e.g., FIGS. 3(a) and 3(b)) stored in the data/process provenance models 250, the desired integrated data/metadata, how data/metadata are to be integrated to achieve that, and the operations to be applied to which piece of data/metadata and sequence thereof. Once such decisions are made, the data/metadata processing controller 710 invokes a sequence of processing units (730) in a pre-determined order to process pre-determined pieces of data/metadata to produce the desired integrated data/metadata. For example, if videos (data) of the same movie are received from different data sources, each of the videos may have its own resolution and metadata and the data/metadata processing controller 710 may integrate the videos of different resolutions to generate an integrated video of the movie with enhanced resolution (integrated data) and integrated metadata that combines the metadata from different sources, as illustrated in FIG. 5. As discussed above, to do so, various operations such as map and reduce operations may be applied to metadata from different sources with a certain sequence to achieve the desired result.

Each processing unit (730-a, . . . , 730-c) may, when it is invoked, forward information related to the operation applied and the particular piece of data/metadata to be processed to the processing logger 720. Based on such received information from different processing units, the processing logger 720 establishes and tracks the data/process sequence information to be used to create a data/process provenance representation. Such data/process sequence information is forwarded to the provenance representation generator 260 (FIG. 2) and used to create the data/process provenance representations.

Figure 7B:
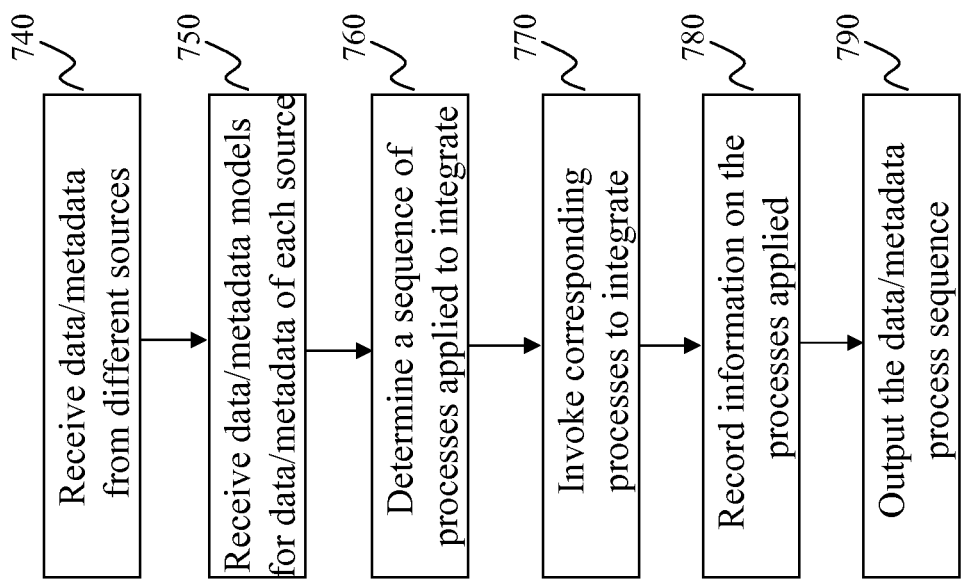
FIG. 7(b) is a flowchart of an exemplary process in which data/metadata from different data sources are integrated to generate integrated metadata, according to an embodiment of the present teaching.

FIG. 7(b) is a flowchart of an exemplary process in which data/metadata from different data sources are integrated to generate integrated data/metadata, according to an embodiment of the present teaching. Data/metadata from different sources are first received at 740. Models that characterize such data/metadata in terms of granularity and provenance are also received at 750. A sequence of operations to be applied to different pieces of data/metadata is determined at 760 and is used to invoke, at 770, corresponding processes to integrate the data/metadata from different sources. Information related to processes applied to different portions of data/metadata is then recorded at 780 and output at 790.

Figure 8A:
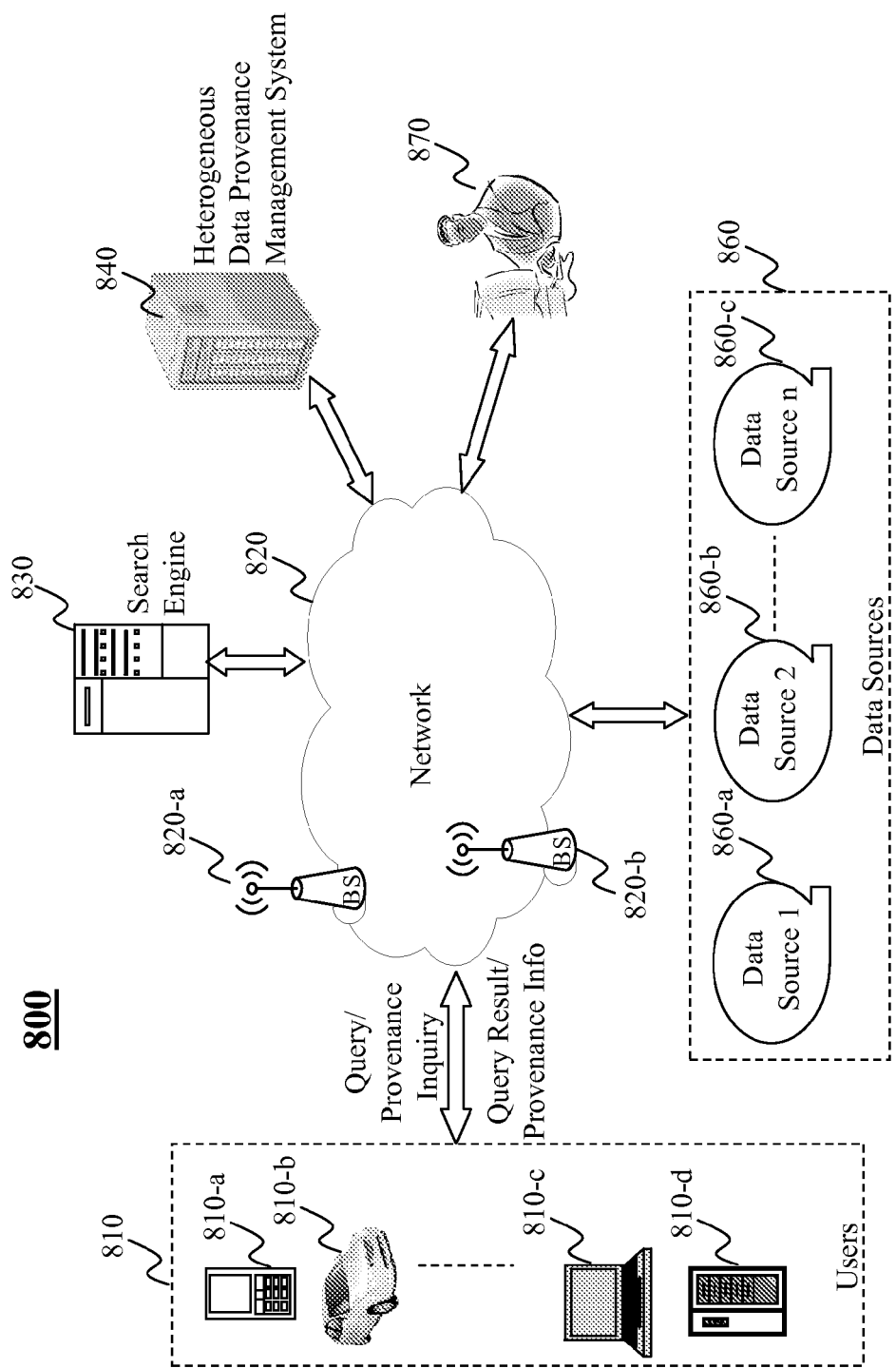
FIGS. 8(a)-8(c) depicts exemplary embodiments of a networked environment in which heterogeneous data management is applied, according to an embodiment of the present teaching.
Figure 8B:
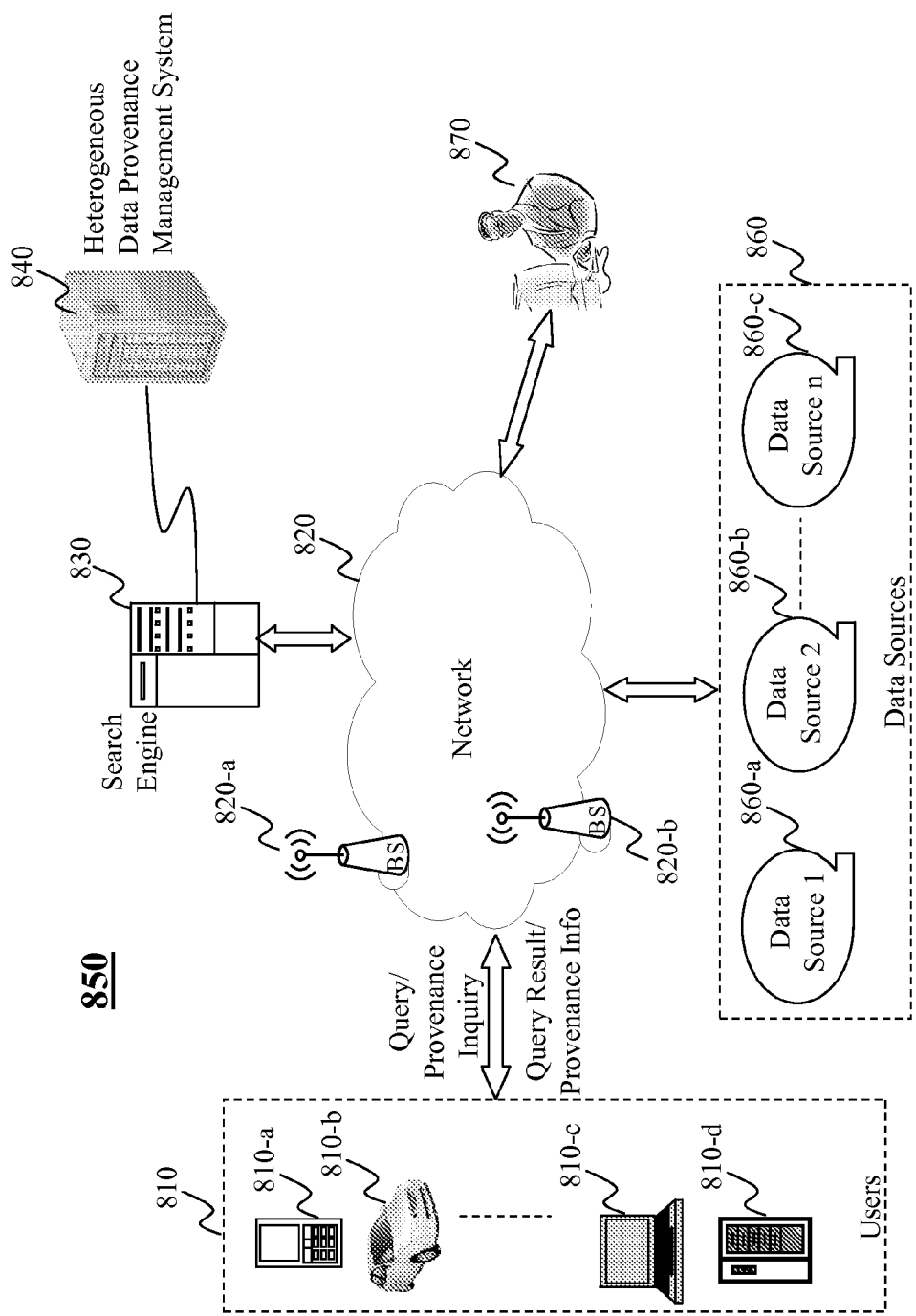
Figure 8C:
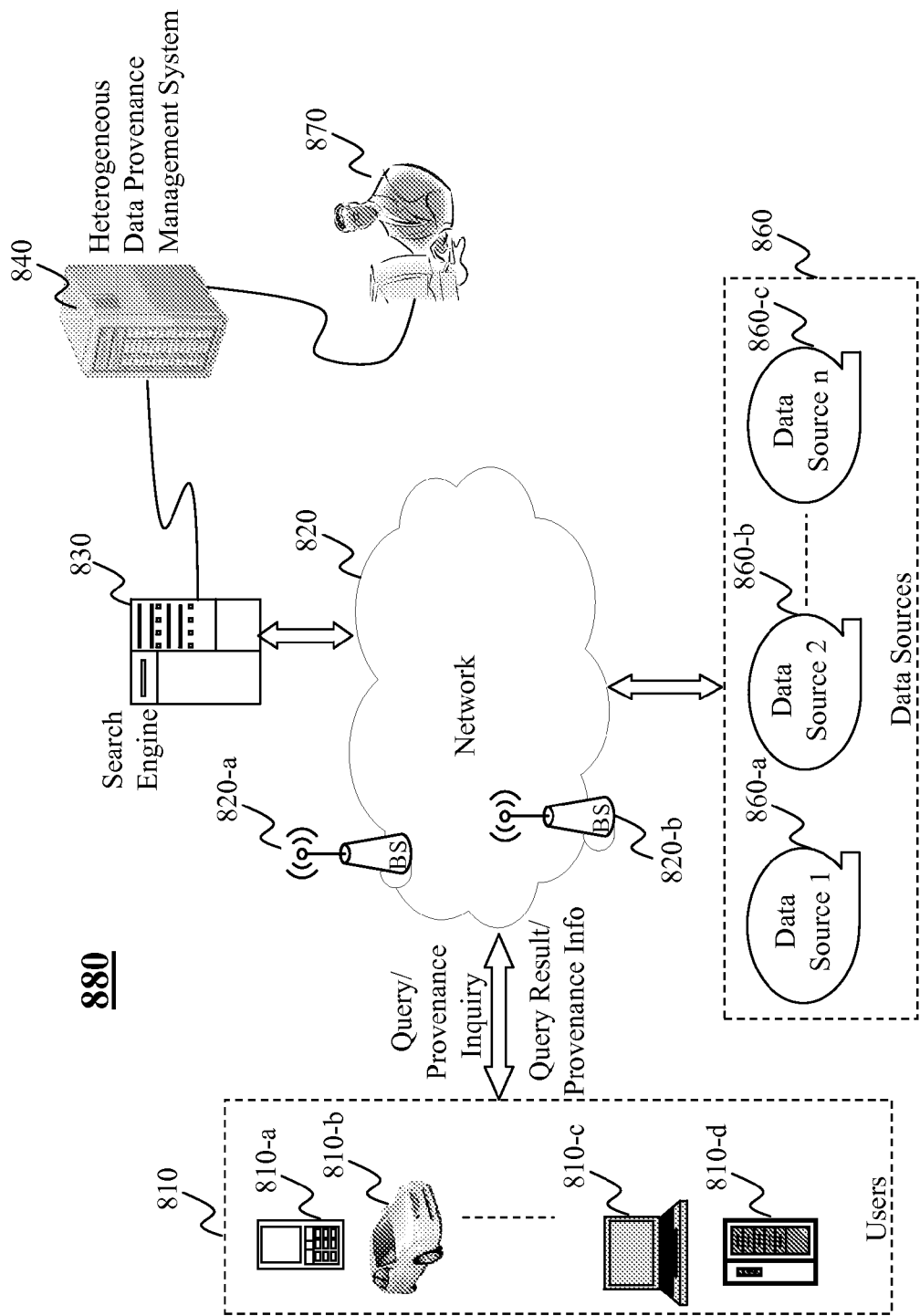

FIGS. 8(a)-8(c) depict high level exemplary system configurations in which heterogeneous data provenance management is deployed to facilitate data integration and uniform query, according to an embodiment of the present teaching. In FIG. 8(a), the exemplary system 800 includes users 810, a network 820, a search engine 830, data sources 860 including heterogeneous data source 1 860-a, data source 2 860-b, . . . , data source n 860-c, and a heterogeneous data provenance management system 840. The network 820 can be a single network or a combination of different networks. For example, a network can be a local area network (LAN), a wide area network (WAN), a public network, a private network, a proprietary network, a Public Telephone Switched Network (PSTN), the Internet, a wireless network, a virtual network, or any combination thereof. A network may also include various network access points, e.g., wired or wireless access points such as base stations or Internet exchange points 820-a, . . . , 820-b, through which a data source may connect to the network in order to transmit information via the network.

Users 810 may be of different types such as users connected to the network via desktop connections (810-d), users connecting to the network via wireless connections such as through a laptop (810-c), a handheld device (810-a), or a built-in device in a motor vehicle (810-b). A user may send a query to the search engine 830 via the network 820 and receive a query result from the search engine 830 through the network 820. The user then receives the query result, which can correspond to integrated data or metadata produced by the heterogeneous data provenance management system 840 and accessible to the search engine 830. Upon viewing the integrated data/metadata, a user may further inquire about the source, granularity, or processing applied to the original data to derive the integrated result. The inquiry is also sent to the network 820 and may be ultimately directed, e.g., from the search engine 830, to the heterogeneous data provenance management system 840, which will analyze the data/process provenance representations established in accordance with the present teaching disclosed herein to retrieve information relevant to the inquiry to form a response. Such a response may then be forwarded to the search engine 830 and then forwarded from the search engine 830 to the user via the network 820.

In addition to a user at 810, a different type of user such as 870, which can be a system operator or an administrator, may also be able to interact with the heterogeneous data provenance management system 840 for different queries related to data/metadata integration, processing, and granularities. In some embodiments, user 870 may be classified to have a higher privilege to receive more operational data than user 810. For example, user 870 may be configured to be able to remotely configure the heterogeneous data provenance management system on its operation parameters such as the data granularity hierarchy or process granularity hierarchy. In some embodiments, the heterogeneous data provenance management system 840 may be a third party service provider so that the search engine 830 and user 870 may be customers of the heterogeneous data provenance management system 840. In this case, each user (search engine operator or user 870) may configure separate data/process granularity hierarchies so that the service to different customers may be based on different data/process hierarchies so that services may be individualized.

FIG. 8(b) presents a similarly system configuration as what is shown in FIG. 8(a) except that the heterogeneous data provenance management system 840 is now configured as a backend system of the search engine 830. In this configuration, user 870 may become a customer of the search engine 830 which may subscribe to specific data provenance management services which may be independent of or in addition to the search engine related services. FIG. 8(c) presents yet another different system configuration in which a heterogeneous data provenance management system 840 may be deployed. In this embodiment, the user 870 is a backend operator of the search engine 830 and can interact with the heterogeneous data provenance management system 840 via an internal or proprietary network connection (not shown). It is noted that different configurations as illustrated in FIGS. 8(*a*)-8(*c*) can also be mixed in any manner that is appropriate for a particular application scenario.

FIG. 9 is a flowchart of an exemplary process in which the heterogeneous data provenance management system facilitates queries relating to data/process provenance or relationships existing in the provenance representation, according to an embodiment of the present teaching. The heterogeneous data provenance management system first enables, at 910, access to a data/process provenance representation archive. A query from a user related to data/process provenance is received at 920 and analyzed at 930. Depending on the nature of the query, determined at 940, as to whether it is related to an inquiry regarding data/process provenance or a relationship that can be inferred from a provenance representation, the heterogeneous data provenance management system 140 retrieves information relating to data/process provenance/granularity (at 950) and/or infers, at 960, certain relationships among data/process elements based on the provenance representation stored in the archive. Information thus obtained is then used, at 970, to generate an answer to the query. The answer is returned, at 980, as a response to the query.

It is understood that, although exemplary measurements reflecting the interestingness of an explanation are described herein, they are by ways of example rather than limitation. Any other appropriate and reasonable measurements can be employed to perform heterogeneous data management as disclosed herein and they will be all within the scope of the present teaching.

To implement the present teaching, computer hardware platforms may be used as the hardware platform(s) for one or more of the elements described herein (e.g., the data/metadata modeling unit 220, the data/metadata integration unit 230, the provenance representation generator 260, and the data/metadata manager 280). The hardware elements, operating systems and programming languages of such computers are conventional in nature, and it is presumed that those skilled in the art are adequately familiar therewith to adapt those technologies to implement the DCP processing essentially as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 10:
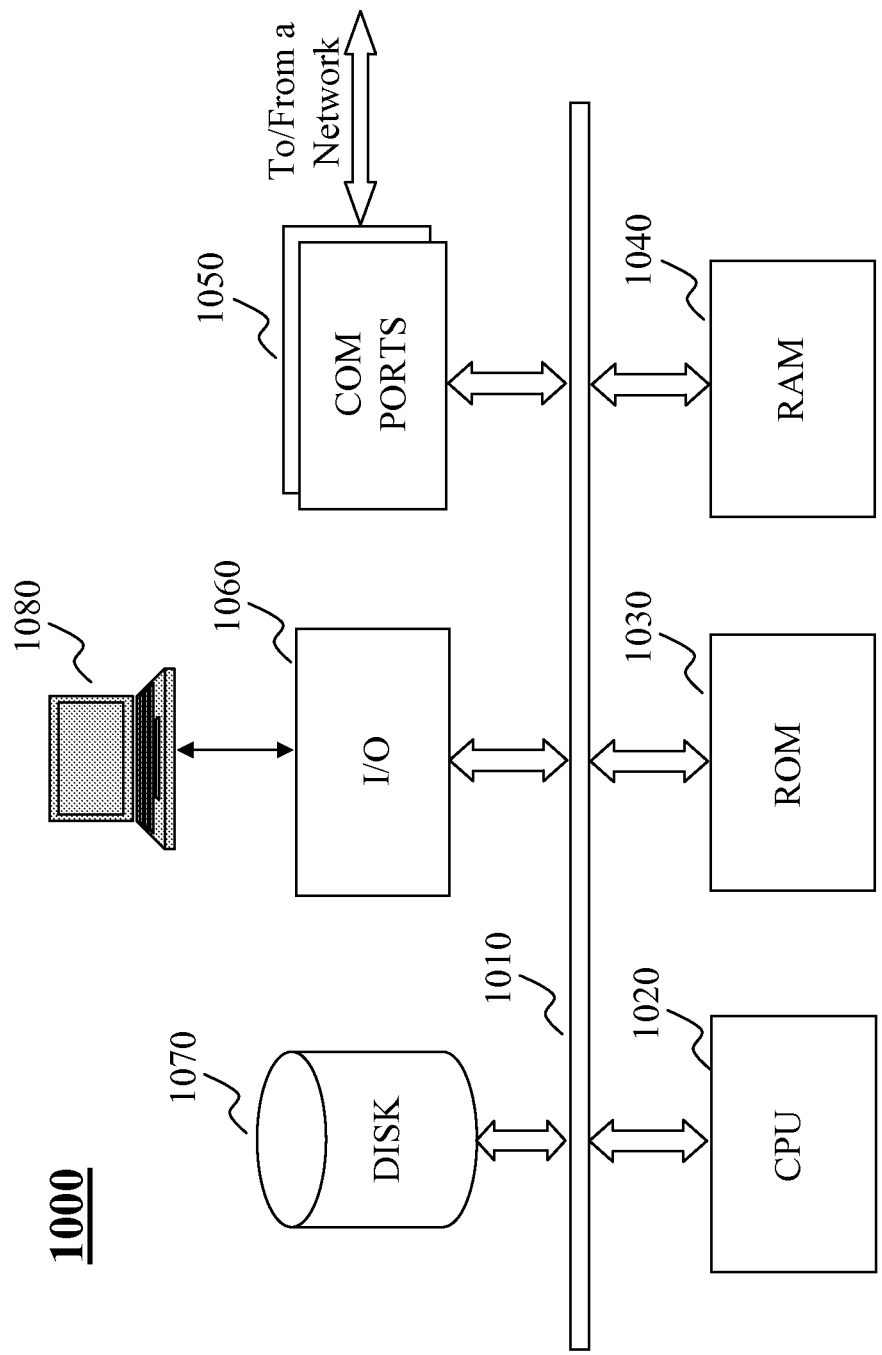
FIG. 10 depicts a general computer architecture on which the present teaching can be implemented.

FIG. 10 depicts a general computer architecture on which the present teaching can be implemented and has a functional block diagram illustration of a computer hardware platform that includes user interface elements. The computer may be a general-purpose computer or a special purpose computer. This computer 1000 can be used to implement any components of the heterogeneous data management architecture as described herein. Different components of the heterogeneous data management system 140, e.g., as depicted in FIGS. 1 and 2, can all be implemented on a computer such as computer 1000, via its hardware, software program, firmware, or a combination thereof. Although only one such computer is shown, for convenience, the computer functions relating to dynamic relation and event detection may be implemented in a distributed fashion on a number of similar platforms, to distribute the processing load.

The computer 1000, for example, includes COM ports 1050 connected to and from a network connected thereto to facilitate data communications. The computer 1000 also includes a central processing unit (CPU) 1020, in the form of one or more processors, for executing program instructions. The exemplary computer platform includes an internal communication bus 1010, program storage and data storage of different forms, e.g., disk 1070, read only memory (ROM) 1030, or random access memory (RAM) 1040, for various data files to be processed and/or communicated by the computer, as well as possibly program instructions to be executed by the CPU. The computer 1000 also includes an I/O component 1060, supporting input/output flows between the computer and other components therein such as user interface elements 1080. The computer 1000 may also receive programming and data via network communications.

Hence, aspects of the method of managing heterogeneous data/metadata/processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the search engine operator or other explanation generation service provider into the hardware platform(s) of a computing environment or other system implementing a computing environment or similar functionalities in connection with generating explanations based on user inquiries. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the dynamic relation/event detector and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for heterogeneous data management, comprising the steps of:
   obtaining, via the communication platform, information from a plurality of data sources;
   modeling, by a data/metadata modeling unit, the data/metadata from each of the data sources based on provenance and/or granularity information associated with the data/metadata to generate data/metadata models;
   integrating, by a data/metadata integration unit, the data/metadata from the plurality of data sources, by applying one or more processes to the data/metadata from different data sources in accordance with the data/metadata models, to generate integrated data/metadata;
   creating, by a provenance representation generator, a provenance representation of the integrated data/metadata that traces the plurality of data sources, granularities, and the one or more processes applied to generate the integrated data/metadata from the plurality of data sources;
   receiving, by a data/metadata manager, a query originated from a user, regarding information associated with the integrated data/metadata; and
   providing, by the data/metadata manager, a response directed to the query derived based on the provenance representation of the integrated data/metadata.

2. The method of claim 1, wherein the provenance representation integrates:
   a first portion representation representing a relationship among at least one of the data/metadata from the plurality of data sources, any processing result from the one or more processes applied, and the integrated data/metadata; and
   a second portion representation representing a relationship between the one or more processes applied and the first portion representation.

3. The method of claim 1, wherein the step of modeling comprises:
   extracting data/metadata from the underlying source;
   extracting identifying information used to identify the underlying source;
   determining a granularity of the data/metadata from the underlying source, wherein the granularity represents a resolution of the data/metadata when the data/metadata comprise video data;
   generating a model for the data/metadata from the underlying source based on the identifying information and the granularity of the data/metadata; and
   outputting the model generated for the data/metadata from the underlying source.

4. The method of claim 1, wherein the step of integrating comprises:
   receiving data/metadata models for data/metadata from the plurality of data sources;
   determining a sequence of the one or more processes applied to integrate the data/metadata based on the data/metadata models;
   invoking, in accordance with the sequence, the one or more processes to process the data/metadata from the plurality of sources to generate the integrated data/metadata; and
   recording the sequence of the one or more processes applied.

5. The method of claim 1, wherein the step of providing comprises:
   analyzing the query received;
   retrieving information relating to the source, granularity of the integrated data/metadata, process applied on the data/metadata from the provenance representation or inferring a relationship inquired by the query based on the information retrieved; and
   generating the response to the query based on the information retrieved from the provenance representation and/or the relationship inferred.

6. A system for heterogeneous data management, comprising:
   a heterogeneous data/metadata input unit implemented on a processor and configured for obtaining, via a communication platform, information from a plurality of data sources;
   a data/metadata modeling unit implemented on the processor and configured for modeling the data/metadata from each of the data sources based on a source and/or granularity information associated with the data/metadata to generate data/metadata models;
   a data/metadata integration unit implemented on the processor and configured for integrating the data/metadata from the plurality of data sources, by applying one or more processes to the data/metadata from different data sources in accordance with the data/metadata models, to generate integrated data/metadata;
   a provenance representation generator implemented on the processor and configured for creating a provenance representation of the integrated data/metadata that traces the plurality of data sources, granularities, and the one or more processes applied to generate the integrated data/metadata from the plurality of data sources, wherein the provenance representation is stored in a memory coupled to the processor;
   a data/metadata manager implemented on the processor and configured for receiving a query, originated from a user, regarding information associated with the integrated data/metadata and providing a response directed to the query based on the provenance representation of the integrated data/metadata.

7. The system of claim 6, wherein the data/metadata modeling unit comprises:
a data/metadata provenance extractor configured for extracting identifying information used to identify the underlying source;
a data/metadata granularity extractor configured for determining a granularity of the data/metadata from the underlying source;
a provenance model generator configured for generating a model for the data/metadata from the underlying source based on the identifying information and the granularity of the data/metadata and outputting the model generated for the data/metadata from the underlying source.

8. The system of claim 6, wherein the data/metadata integration unit comprises:
a data/metadata processing controller configured for receiving data/metadata models for data/metadata from the plurality of data sources, determining a sequence of one or more processes to be applied to the data/metadata from different data sources, and invoking the one or more processes to process corresponding data/metadata accordingly to generate the integrated data/metadata; and
a process logger configured for recording the sequence of one or more processes applied to the data/metadata and outputting the recorded sequence applied to the data/metadata from the data sources.

9. The system of claim 6, wherein the provenance representation is an integration of:
a first portion representation representing at least one of the data/metadata from the plurality of data sources, any processing result from the one or more processes applied, and the integrated data/metadata; and
a second portion representation representing the one or more processes applied and how the one or more processes relates to the first portion representation.

10. The system of claim 6, wherein the data/metadata manager is configured to:
analyze the query received;
retrieve information relating to the source, granularity of the integrated data/metadata, process applied on the data/metadata from the provenance representation or infer a relationship inquired by the query based on the information retrieved; and
generate the response to the query based on the information retrieved from the provenance representation and/or the relationship inferred.

11. A machine-readable tangible and non-transitory medium having information for heterogeneous data management recorded thereon, wherein the information, when read by the machine, causes the machine to perform the following
obtaining, via the communication platform, information from a plurality of data sources;
modeling, by a data/metadata modeling unit, the data/metadata from each of the data sources based on source and/or granularity information associated with the data/metadata to generate data/metadata models;
integrating, by a data/metadata integration unit, the data/metadata from the plurality of data sources, by applying one or more processes to the data/metadata from different data sources in accordance with the data/metadata models, to generate integrated data/metadata;
creating, by a provenance representation generator, a provenance representation of the integrated data/metadata that traces the plurality of data sources, granularities, and the one or more processes applied to generate the integrated data/metadata from the plurality of data sources;
receiving, by a data/metadata manager, a query originated from a user, regarding information associated with the integrated data/metadata; and
providing, by the data/metadata manager, a response directed to the query based on the provenance representation of the integrated data/metadata.

12. The medium of claim 11, wherein the provenance representation integrates:
a first portion representation representing at least one of the data/metadata from the plurality of data sources, any processing result from the one or more processes applied, and the integrated data/metadata; and
a second portion representation representing the one or more processes applied and how the one or more processes relates to the first portion representation.

13. The medium of claim 11, wherein the step of modeling comprises:
extracting data/metadata from the underlying source;
extracting identifying information used to identify the underlying source;
determining a granularity of the data/metadata from the underlying source;
generating a model for the data/metadata from the underlying source based on the identifying information and the granularity of the data/metadata; and
outputting the model generated for the data/metadata from the underlying source.

14. The medium of claim 11, wherein the step of integrating comprises:
receiving data/metadata models for data/metadata from the plurality of data sources;
determining a sequence of the one or more processes applied to integrate the data/metadata based on the data/metadata models;
invoking, in accordance with the sequence, the one or more processes to process the data/metadata from the plurality of sources to generate the integrated data/metadata; and
recording the sequence of the one or more processes applied.

15. The medium of claim 11, wherein the step of providing comprises:
analyzing the query received;
retrieving information relating to the source, granularity of the integrated data/metadata, process applied on the data/metadata from the provenance representation or inferring a relationship inquired by the query based on the information retrieved; and
generating the response to the query based on the information retrieved from the provenance representation and/or the relationship inferred.

16. A method, implemented on a machine having at least one processor, storage, and a communication platform connected to a network for generating a data provenance representation, comprising the steps of:
obtaining, via the communication platform, information from a plurality of data sources;
modeling, by a data/metadata modeling unit, the data/metadata from each of the data sources based on a source and/or granularity information associated with the data/metadata to generate data/metadata models;
integrating, by a data/metadata integration unit, the data/metadata from the plurality of data sources, by applying one or more processes to the data/metadata from different data sources in accordance with the data/metadata models, to generate integrated data/metadata;

creating, by a provenance representation generator, a provenance representation of the integrated data/metadata that traces the plurality of data sources, granularities, and the one or more processes applied to generate the integrated data/metadata from the plurality of data sources; and archiving the provenance representation of the integrated data/metadata for enabling a query associated with the integrated data/metadata on source and/or granularity.

17. The method of claim 16, wherein the provenance representation integrates:

a first provenance representation representing at least one of the data/metadata from the plurality of data sources, any processing result from the one or more processes applied, and the integrated data/metadata; and a second provenance representation representing the one or more processes applied and how the one or more processes relates to the first provenance representation.

18. A method, implemented on a machine having at least one processor, storage, and a communication platform connected to a network for processing data provenance query, comprising the steps of:

enabling, by a data/metadata manager, an access to an archive storing one or more provenance representations of integrated data/metadata, wherein the integrated data/metadata is generated from a plurality of data sources, by applying one or more processes to the data/metadata from different data sources in accordance with data/metadata models, and each of the one or more provenance representations traces the plurality of data sources, granularities, and the one or more processes applied to generate the integrated data/metadata from the plurality of data sources;

receiving, via the communication platform, a query originated from a user, regarding information associated with the integrated data/metadata;

analyzing the query received to determine information queried;

accessing the archive to retrieve at least one provenance representation;

extracting the queried information from the at least one provenance representation; and generating a response based on the queried information as a response to the query.

19. The method of claim 18, wherein the step of providing comprises:

retrieving information relating to the source and/or granularity of the integrated data/metadata from any of the provenance representation, if the query relates to the source and granularity of the data/metadata contained in the integrated data/metadata; and retrieving information relating to at least one process applied to the data/metadata from the plurality of sources to derive the integrated data/metadata from the provenance representation, if the query relates to the processes applied to derive the integrated data/metadata.

20. The method of claim 18, wherein each provenance representation integrates:

a first portion representation representing a relationship among at least one of the data/metadata from the plurality of data sources, any processing result from the one or more processes applied, and the integrated data/metadata; and a second portion representation representing a relationship between the one or more processes applied and the first portion representation.

* * * * *